UNITED STATES PATENT OFFICE.

NEHEMIAH P. STANTON, OF SYRACUSE, NEW YORK.

IMPROVEMENT IN THE MANUFACTURE OF SALT.

Specification forming part of Letters Patent No. 4,157, dated August 20, 1845.

*To all whom it may concern:*

Be it known that I, NEHEMIAH P. STANTON, of the village of Syracuse, in the county of Onondaga and State of New York, have discovered and invented a new and useful art or mode of separating and removing the impurities contained in salt-water or brine in its crude state and fitting it to be manufactured into pure salt; and I do hereby declare that the following is a full and exact description.

The nature of my invention, discovery, or improvement consists in the use of common salt to saturate the water or brine as taken from salt springs or wells, and separating the impurities contained therein without evaporation by artificial or solar heat, or the use of quicklime or other ingredients for that purpose.

The mode or process is to add to the salt-water or brine in its crude state a sufficient quantity of common salt to bring the salt-water or brine to saturation, at which state the impurities begin to precipitate, settling at the bottom of the vat or reservoir containing the same. When the precipitation of impurities has fully taken place, which will require more or less time, according to the purity of the salt added to the salt-water to effect the saturation, (if pure salt is added the time may be about twenty-four hours, and more time will be required when the salt added is impure,) the water or brine thus purified may be drawn off into kettles or pans for boiling or evaporation by artificial heat when pure.

The benefits to be derived from this discovery are, first, a more perfect separation of the impurities contained in the salt-water or brine in its crude state; second, the kettles or pans used for boiling or evaporating are less liable to become foul or crusted with what is commonly called "bitterns." The salt manufactured is free from any portion of the quicklime or other ingredients used to precipitate or remove the impurities contained in the brine as taken from the springs or wells.

What I claim as my invention, discovery, art, or improvement, and desire to secure by Letters Patent, is—

The art or process of separating the impurities contained in salt-water or brine in its crude state by adding a sufficient quantity of common salt to the salt-water taken from the salt springs, wells, or other source in its crude state, when properly mixed and dissolved, to bring the brine in the vats or cisterns to immediate saturation for the express purpose of precipitating the impurities and depositing them in the bottom of the vats or cisterns without the aid of evaporation or of solar or artificial heat. I do not claim adding salt to salt-water for the purpose of concentration, as is frequently done, but the process above described of separating the impurities from salt-water by the addition of salt thereto, allowing the impurities sufficient time to settle, and then drawing off for evaporation.

Dated August 11, 1845.

NEHEMIAH P. STANTON.

Witnesses:
 WM. H. KING,
 W. THOMPSON.